United States Patent
Yuan et al.

(10) Patent No.: US 8,731,087 B2
(45) Date of Patent: May 20, 2014

(54) UPLINK MIMO TRANSMISSION FROM MOBILE COMMUNICATIONS DEVICES

(75) Inventors: Jun Yuan, Ottawa (CA); Hosein Nikopourdeilami, Stittsville (CA); Mo-Han Fong, Ottawa (CA)

(73) Assignee: Microsoft Corporation, Redmond, WA (US)

(*) Notice: Subject to any disclaimer, the term of this patent is extended or adjusted under 35 U.S.C. 154(b) by 661 days.

(21) Appl. No.: 12/827,626

(22) Filed: Jun. 30, 2010

(65) Prior Publication Data
US 2011/0051835 A1    Mar. 3, 2011

Related U.S. Application Data

(60) Provisional application No. 61/221,775, filed on Jun. 30, 2009.

(51) Int. Cl.
*H04L 1/02* (2006.01)
*H04B 7/02* (2006.01)

(52) U.S. Cl.
USPC ........... 375/267; 375/299; 375/347; 455/101; 370/334

(58) Field of Classification Search
USPC ............ 375/267, 299, 347; 455/101; 370/334
See application file for complete search history.

(56) References Cited

U.S. PATENT DOCUMENTS

2003/0125040 A1* 7/2003 Walton et al. ................. 455/454
2007/0254652 A1* 11/2007 Khan et al. ................. 455/435.1

OTHER PUBLICATIONS

Hamiti, Shkumbin. The Draft IEEE 802.16m System Description Document, submitted Apr. 30, 2008.

* cited by examiner

*Primary Examiner* — Ted Wang
(74) *Attorney, Agent, or Firm* — Alin Corie; Mike Allen; Micky Minhas (57) ABSTRACT

A method of uplink transmission from a mobile device having multiple antennas to a base station having multiple antennas includes transmitting in an open-loop single-user MIMO mode when the mobile device is at high speed, transmitting in a closed-loop single-user MIMO mode when the mobile device is at low speed, and, upon request, transmitting in a multi-user collaborative MIMO mode. The method also includes controlling uplink transmissions in a selected one of the open-loop single-user MIMO, the closed-loop single-user MIMO and the multi-user collaborative MIMO modes. Uplink transmissions from the mobile device may be transmitted using multiple antennas of the mobile device. Upon request, the mobile device may switch to transmitting in multi-user collaborative MIMO mode with a subset of the multiple antennas.

36 Claims, 8 Drawing Sheets

UPLINK MIMO TRANSMISSION FROM MOBILE COMMUNICATIONS DEVICES

CROSS-REFERENCE TO RELATED APPLICATIONS

This application claims priority from U.S. Provisional Application No. 61/221,775 filed Jun. 30, 2009, the contents of which are hereby incorporated herein by reference.

FIELD OF THE INVENTION

This application relates to wireless communications systems. More specifically, this application relates to uplink communication techniques.

BACKGROUND OF THE INVENTION

The Draft IEEE 802.16m system Description document, IEEE 802.16m-08/003r1, dated Apr. 15, 2008, provides that the IEEE 802.16m amendment to the IEEE 802.16 standard is intended to "provide performance improvements necessary to support future advanced series and applications . . . " As additional background to the present application, the IEEE 802.16 standard is incorporated herein by reference.

Known wireless communications schemes may involve the use of a single antenna or multiple antennas on a transmitter and/or receiver. A multiple-input, multiple-output (MIMO) wireless communication system has multiple communication channels that are used between a plurality of antennas at a transmitter and a receiver. Accordingly, in a MIMO system a transmitting device will have N antennas, and a receiving device will have M antennas. Space-time coding controls what data is transmitted from each of the N antennas. A space-time encoding function at the transmitter processes data to be transmitted and creates unique information to transmit from the N antennas. Each of the M antennas will receive signals transmitted from each of the N antennas. A space-time decoding function at the receiving device will process the information sent from the N antennas to recover the data.

It has been recognized that as compared to with older, conventional technology, a MIMO wireless communication system provides an improvement in range and capacity of a connection between a client (e.g. a mobile communications device) and an access point (e.g. a base station). This in turn, is understood to typically result in, among other things, more reliable signal quality, a larger bandwidth connection and increased overall system throughput.

In practice, integrating multiple receive antennas at a client, especially small client devices such as mobile communications devices, has been a challenge for a number of reasons, including, but not limited to, reduction in the size of each antenna to fit in a space-constrained environment and obtaining sufficient operational bandwidth from the small antennas. Other problems include undesirable interaction between antennas that are physically located near each other. For these reasons, and others, mobile communications devices typically only supported a single antenna.

Consequently, while communications between certain components of wireless communication systems may have employed MIMO modes/techniques (e.g. between base stations and relays, where the base station and relay may have multiple transmit antennas), little emphasis was placed on developing or employing MIMO modes in uplink transmissions (i.e. transmissions from a mobile communications device to a base station) due to the relative unavailability of multiple (i.e. more than one) transmit antennas at mobile communications devices.

However, with recent technological advances, mobile communications devices with multiple antennas have become available. Therefore, the use of MIMO techniques/modes in uplink communications has become desirable, as it is expected to result in, among other things, increased data transmission rates from mobile communications devices. This is turn is expected to provide improved user experience.

SUMMARY OF THE INVENTION

In a first aspect of the invention, there is provided a method of uplink transmission from a mobile device having multiple antennas to a base station having multiple antennas. The method includes transmitting in an open-loop single-user MIMO mode when the mobile device is at high speed; transmitting in a closed-loop single-user MIMO mode when the mobile device is at low speed; transmitting in a multi-user collaborative MIMO mode upon request; and controlling transmission in a selected one of the open-loop single-user MIMO, the closed-loop single-user MIMO and the multi-user collaborative MIMO modes.

In a second aspect of the invention, there is provided method of uplink transmission from a mobile device having multiple antennas to a receiver having multiple antennas including transmission in single-user MIMO mode with the multiple antennas; and upon request, transmitting in multi-user collaborative MIMO mode with a subset of the multiple antennas.

In a third aspect of the invention, there is provided a mobile device having a plurality of antennas. The mobile device further includes a processor operable to cause the mobile device to transmit in an open-loop single-user MIMO mode when the mobile device is moving with high velocity with multiple antennas of the plurality of antennas; transmit in a closed-loop single-user MIMO mode when the mobile device is moving with low velocity with multiple antennas of the plurality of antennas; transmit in a multi-user collaborative MIMO mode upon request with only a subset of the plurality of antennas; and control transmission from the mobile device in a selected one of the open-loop single-user MIMO, the closed-loop single-user MIMO and the multi-user collaborative MIMO modes.

In a fourth aspect of the invention, there is provided a communications system. The system includes a base station having multiple antennas for communicating with mobile devices. The system further includes a given mobile device of a plurality of mobile devices, each of the plurality of mobile devices having multiple antennas. The system even further includes a controller in communication with the base station and the mobile communications devices. The controller is operable to direct the given mobile device to transmit uplink transmissions, in single-user MIMO mode using multiple antennas of the given mobile communications device, or in multi-user collaborative MIMO mode using only a subset of the multiple antennas of the given mobile device.

Other aspects and features of the present invention will become apparent to those of ordinary skill in the art upon review of the following description of specific embodiments of the disclosure in conjunction with the accompanying figures.

BRIEF DESCRIPTION OF THE DRAWINGS

In the figures which illustrate by way of example only, embodiments of the present disclosure.

DETAILED DESCRIPTION

Figure 1:
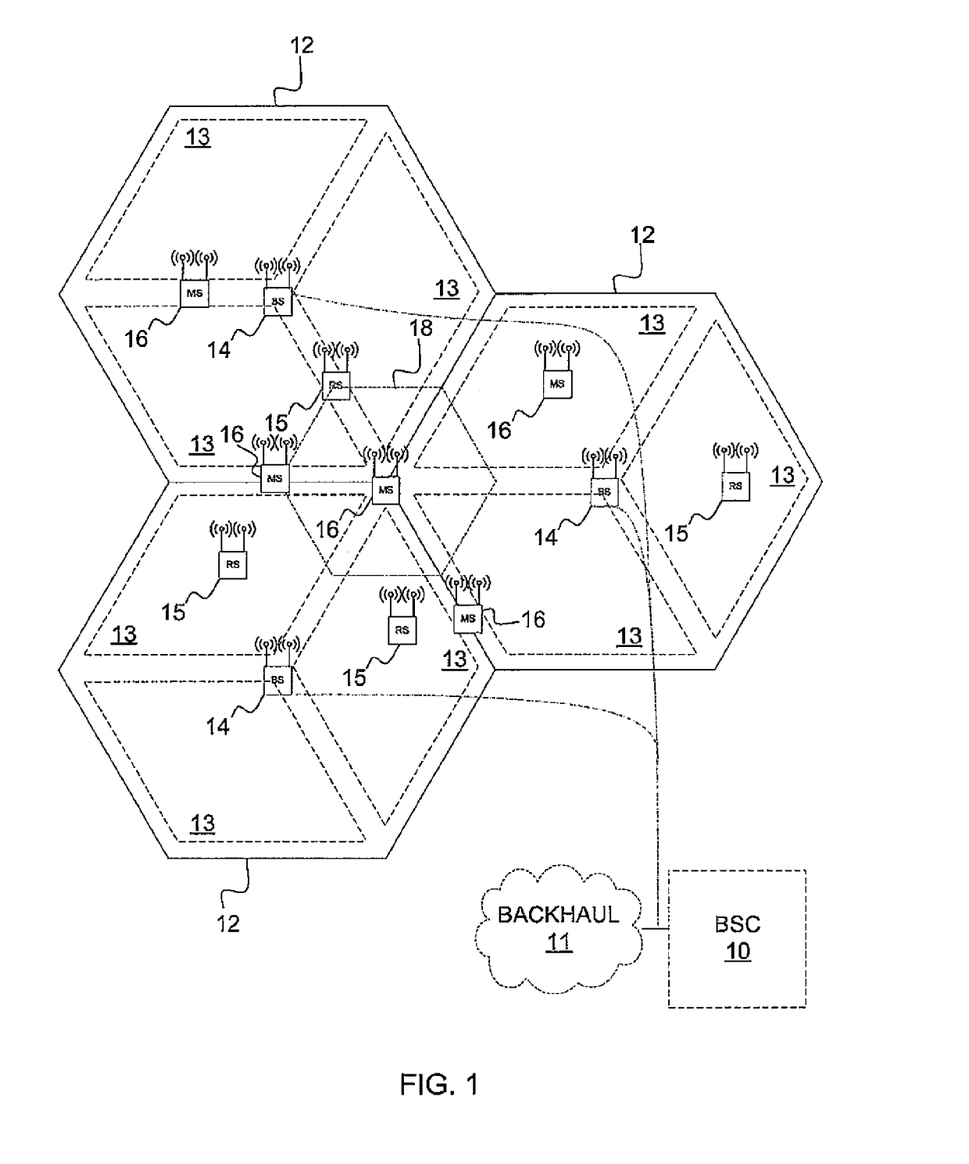
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals (also hereinafter referred to as "mobile communications devices" or "mobile devices") 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed off from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
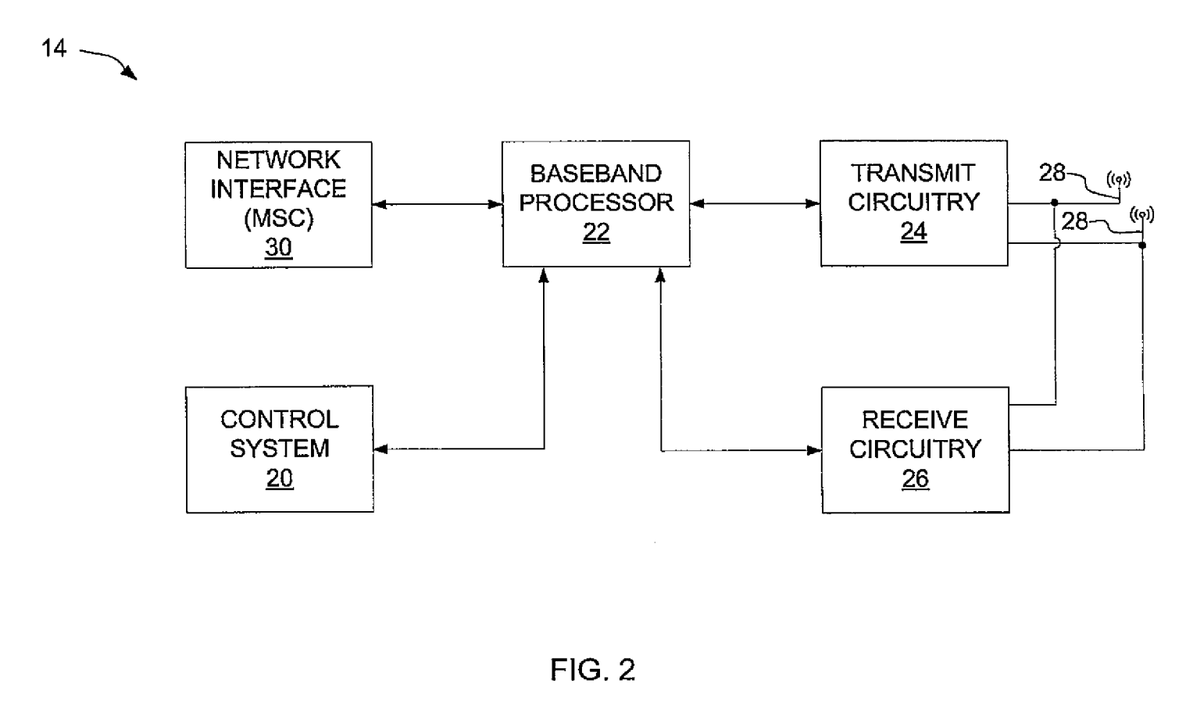
FIG. 2 is a block diagram of an example base station that might be used to implement some embodiments of the present application.

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
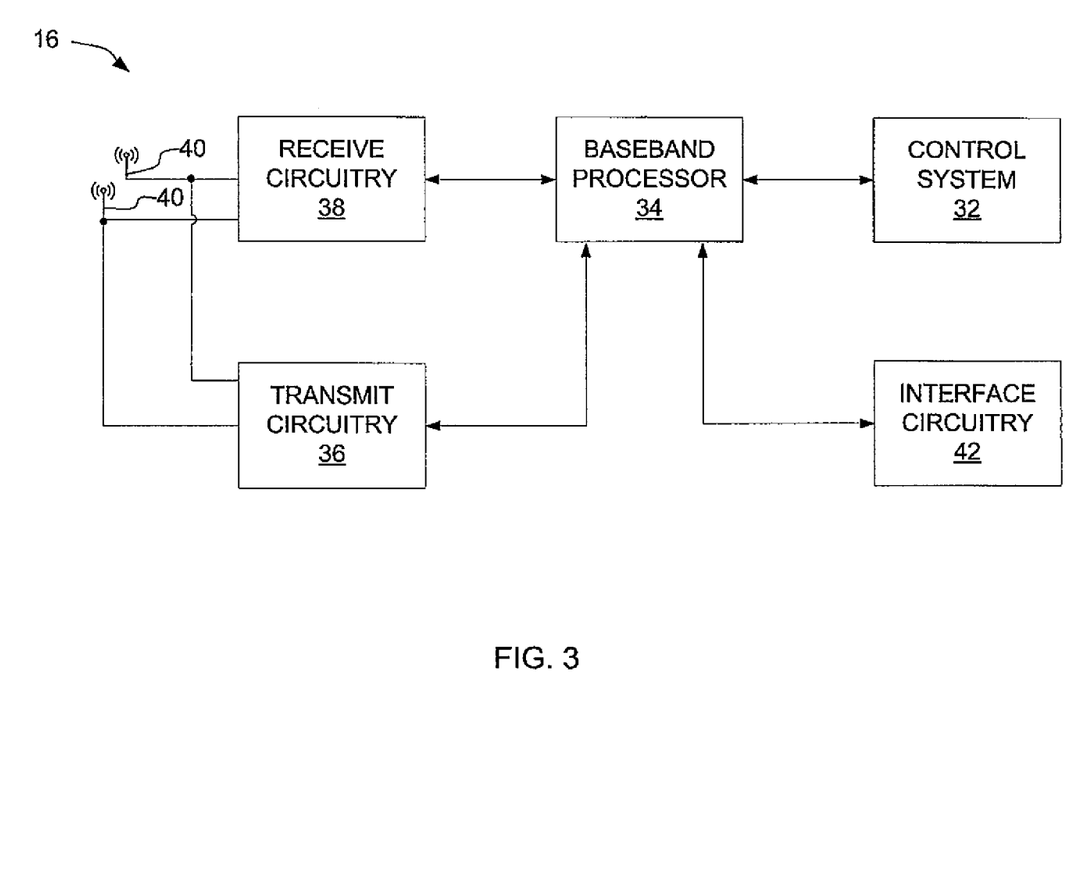
FIG. 3 is a block diagram of an example wireless terminal that might be used to implement some embodiments of the present application.

With reference to FIG. 3, an example of a mobile terminal 16 is illustrated. Similar to the base station 14, the mobile terminal 16 may include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16, but may, in accordance with the present disclosure, be used for uplink transmission from the mobile terminals 16 to base stations 14. Each base station 14 is equipped with "M" antennas 28 (M>=1), and each mobile terminal 16 is equipped with "N" antennas 40 (N>=1). Notably, the respective antennas can be used for both reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
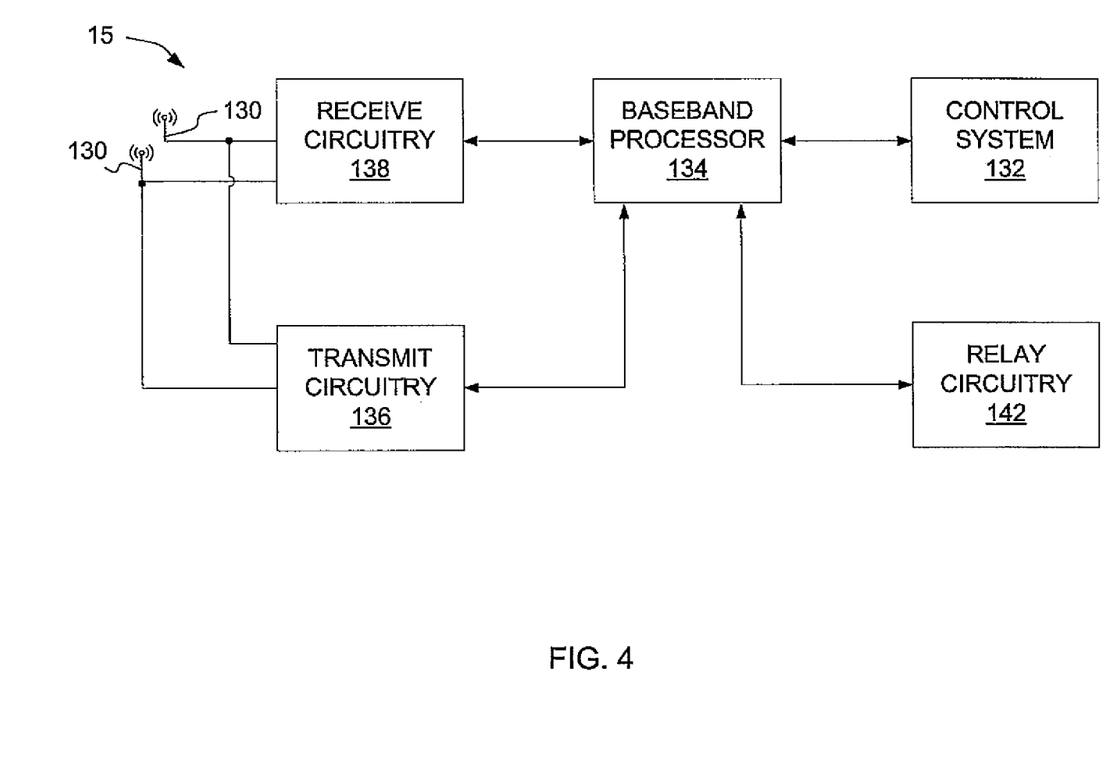
FIG. 4 is a block diagram of an example relay station that might be used to implement some embodiments of the present application.

With reference to FIG. 4, an example of a relay station 15 is illustrated. Similar to the base station 14, and the mobile terminal 16, the relay station 15 may include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carriers signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
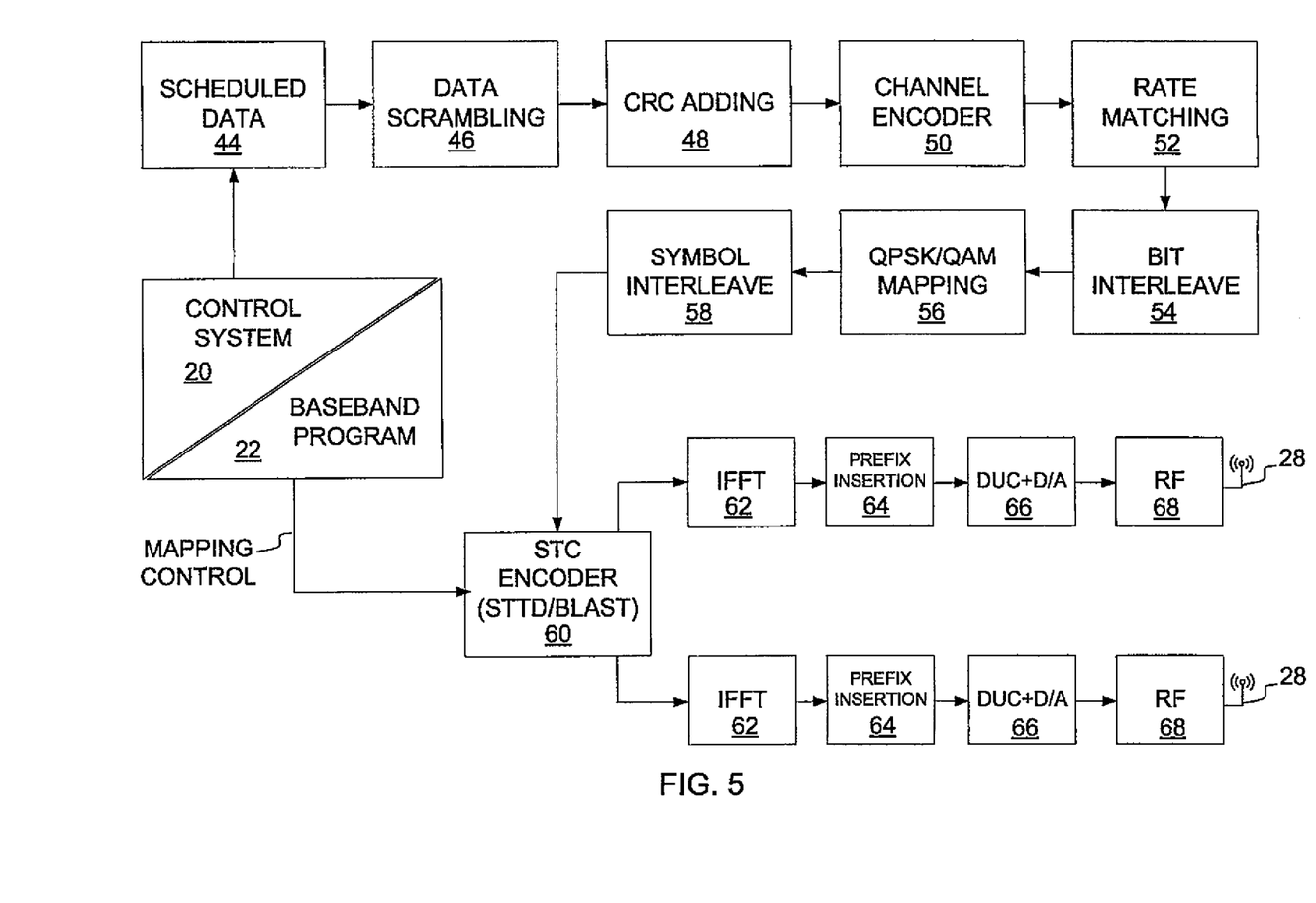
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation (MCS) for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAIVI) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 and the STC 10 encoder logic 60 provides two output streams of symbols. Accordingly, each of the symbol streams output by the SIC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
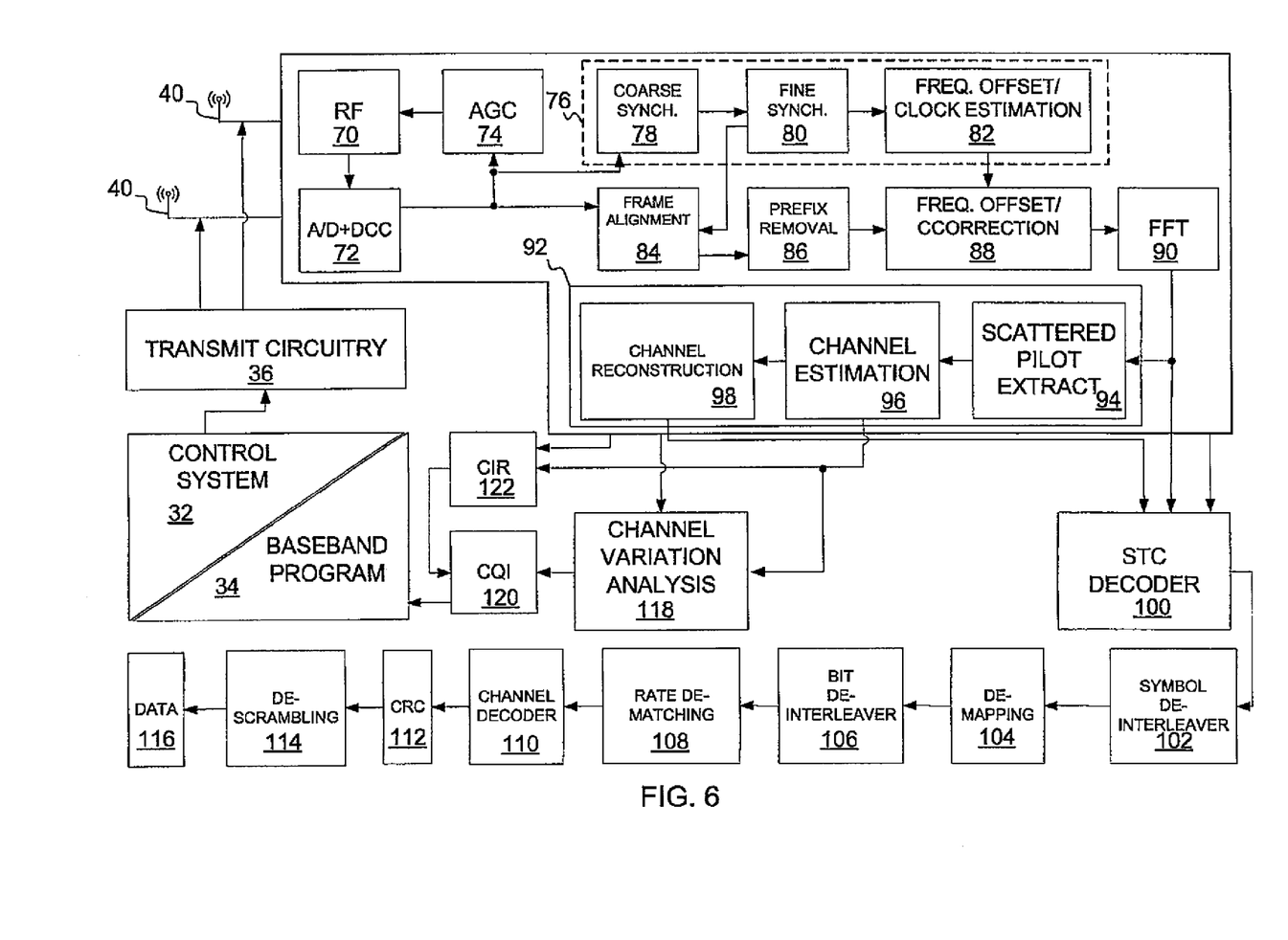
FIG. 6 is a block diagram of a logical breakdown of an example OFDM receiver architecture 20 that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the—extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using dc-mapping logic 104. The bits are then de-interleaved using bit de-interleaver logic 106, which corresponds to the bit interleaver logic 54 of the transmitter architecture. The dc-interleaved bits are then processed by rate dc-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station dc-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

In some embodiments, a relay station may operate in a time division manner using only one radio, or alternatively include multiple radios.

In the context of the present disclosure, i.e. uplink transmissions from a mobile device 16 to a base station 14, the exemplary OFDM transmitter, like the one described in FIG. 5, may be integrated into mobile device 16, and the exemplary OFDM receiver, like the one described in FIG. 6, may be integrated into base station 14. Thus conveniently, uplink transmissions from mobile device 14 may be transmitted using OFDM techniques to base station 14. Moreover, mobile device 16 and base station 14 may include hardware, firmware, digital signal processors, and the like, to carry out the specific coding and multiplexing techniques detailed below.

Conveniently, as mobile devices 16 may now be equipped with multiple antennas, MIMO techniques may be extended to transmissions from mobile devices 16 to base stations 14. As previously described, in a MIMO system, a transmitting device (e.g. mobile device 16) will have N antennas (e.g. antennas 40), and a receiving device (e.g. base station 16) will have M antennas (e.g. antennas 28). Space-time coding controls what data is transmitted from each of the N antennas. A space-time encoding function at the transmitter (e.g. mobile device 16) processes data to be transmitted and creates unique information to transmit from the N antennas (e.g. antennas 40). Each of the M antennas (e.g. antennas 28 at base station 14) will receive signals transmitted from each of the N antennas. Moreover, as may be known to those of ordinary skill in the art, different types of MIMO techniques may be employed such as, for example, single-user MIMO (SU-MIMO) and multi-user MIMO (MU-MIMO).

Mobile station 14 may be capable of transmitting in SU-MIMO mode with one or more antennas (e.g. antenna(s) 40) using known encoding, multiplexing, diversity and the like techniques. Mobile station 14 may also be capable of transmitting in MU-MIMO mode using one or more antenna(s) 40 and known encoding, multiplexing techniques and the like. Conversely, base station 16 may be capable of receiving and decoding such SU-MIMO and MU-MIMO transmissions from mobile device(s) 14. Specific techniques for SU-MIMO and MU-MIMO transmissions, including protocols for such transmissions, may be detailed in relevant industry standards, such as IEEE 802.16, 3GPP (HSPA+, LTE), 3GPP2.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein. It may further be appreciated that the methods and techniques of the present disclosure are intended to (but not limited to) operate within an IEEE 802.16 and draft IEEE 802.16m, 3GPP (HSPA+, LTE), 3GPP2 compliant wireless communications system.

As described above, mobile device 16 may be capable of non-MIMO and MIMO uplink transmissions. When transmitting in MIMO mode, data (scheduled data 44) to be transmitted may be passed through STC encoder 60 (STTD/BLAST) and onto each of the two IFFT 62→prefix insertion 64→DUC+D/A 66→RF 68 paths (FIG. 5) and to antenna(s) 40 for transmission. However, when transmitting in non-MIMO mode, scheduled data 44 may not be encoded by STC encoder 60 but may rather pass to antennas 40 from symbol interleave block 58. Mobile device 16 may shift from non-MIMO mode into MIMO mode upon receiving, for example, a request from base station 14 to do so.

The present disclosure discloses an exemplary scheme wherein a selection is made at the mobile device to transmit in one of SU-MIMO and MU-MIMO modes, in accordance with certain criteria. As will be understood by those of ordinary skill in the art, many factors may drive the consideration as to whether SU-MIMO or MU-MIMO techniques are desirable in a particular scenario. For example, this problem has been explored in the context of downlink transmissions from base stations that have had for some time now the availability of multiple transmit antennas. However, heretofore, little consideration had been given to SU-MIMO or MU-MIMO for uplink transmissions from mobile devices, and in particular, to the conditions in which SU-MIMO or MU-MIMO transmissions from a mobile device would be desirable.

As may be appreciated, MU-MIMO allows a base station to receive transmissions from multiple users (e.g. mobile devices) in the same band simultaneously. Thus, in scenarios where a high number of mobile devices are or have requested connection with a given base station in a given time interval, the base station may, for example, shift into MU-MIMO mode in order to support the high number of mobile devices and increase system throughput as a whole. By contrast, in SU-MIMO mode, a single user has exclusive use of a radio resource and thus may be preferable in cases where maximum throughput of a single user is desired.

Figure 7:
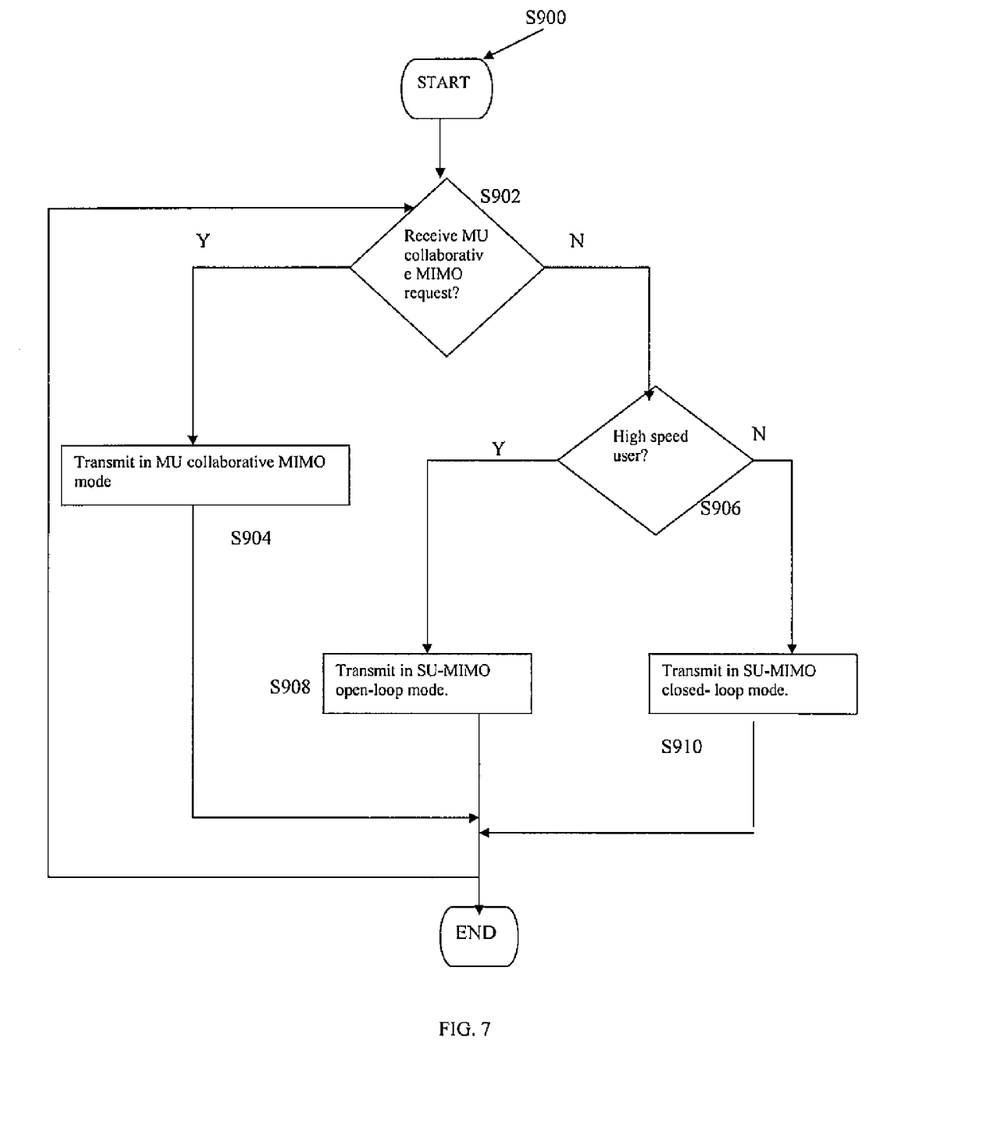
FIG. 7 is a flowchart of steps performed at a mobile communications device involving selecting between three MIMO modes, exemplary of an embodiment of the present disclosure.

FIG. 7 depicts a flowchart, S900, of steps executed at a mobile device, e.g. mobile device 16, when transmitting uplink transmissions to, for example, a base station, exemplary of an embodiment of the present disclosure. In particular, upon establishing contact (or at periodic intervals during contact) with an access point such as base station, a given mobile device 16 may check for or receive instructions from the base station as to the mode for uplink transmissions. Specifically, base station 14 (e.g. under control of base station controller 10, (FIG. 1)) may be programmed to require that, in certain situations, mobile devices connecting to it communicate in multi-user (MU) MIMO modes, such as collaborative MU-MIMO.

In scenarios such as the above, a base station, e.g. base station 14, may send, and mobile station 16 may receive, a request to transmit uplink transmissions in MU-MIMO mode (S902). Upon receipt of the request, if mobile device 16 was not already transmitting in MU-MIMO mode, it may shift to transmitting in MU-MIMO mode (S904).

If however, mobile device 16 does not receive a request to transmit in MU-MIMO mode (e.g., in times of low network usage, base station 14 may not operate in MU-MIMO mode as it may not be supporting as many connections as compared to times of high network usage) mobile device 16 may transmit in another mode, in particular, such as single-user (SU) MIMO mode.

As may be appreciated, within SU-MIMO, open-loop SU-MIMO and closed-loop SU-MIMO may be employed. Also, as may be appreciated, a difference between open-loop and closed-loop MIMO is the utilization of feedback (e.g. channel state information) to adjust encoding at the transmitter in closed-loop MIMO, whereas in open-loop MIMO, the transmitter does not adjust in accordance with received feedback.

While closed-loop MIMO techniques may result in improved transmission performance, a drawback of closed-loop MIMO is that by the time feedback is received, channel conditions may have changed. Thus, when, for example, the mobile device is moving quickly (e.g. situated in a moving vehicle) by the time the mobile device receives feedback, channel conditions may have changed significantly due to the change in position of the mobile device. Thus, open-loop SU-MIMO may be selected when the mobile device (e.g. mobile device 14) is moving quickly (S906, S908). By contrast, in scenarios where the mobile device is moving at low speeds (or in good channel conditions) closed-loop SU-MIMO may be selected (S910) since channel conditions are unlikely to change significantly over a short time interval.

In particular, exemplary techniques for open-loop SU-MIMO may include transmit diversity, spatial multiplexing and rank adaptation. More specifically, transmit diversity using 2 transmit antennas by space time block coding (STBC) or space frequency block coding (SFBC); and using 4 transmit antennas by space time transmit diversity or antenna hopping. Spatial multiplexing (SM) using 2 transmit antennas may be achieved using rate 2 SM; using 4 transmit antennas with rate 2 SM with antenna hopping or rate 3 SM with antenna hopping or rate 4 SM. Rank adaptation may be implemented using semi-rank adaptation, for example, based on geometry or using dynamic rank adaptation. The channelization may be either diversity or localized.

Upon establishing connection with exemplary base station 14, mobile device 16 may acquire data from the base station on which basis selection of specific parameters, such as rank and modulation and coding scheme (MCS) by mobile device 16 for uplink transmissions may be made. For example, in both Frequency Division Duplexing (FDD) and Time Division Duplexing (TDD) systems, mobile station 16 may send a sounding signal and an indication of power headroom of the RF amplifier driving the transmit antenna (e.g. antenna 40) to base station 14. On this basis, base station 14 may then select and transmit an indicator of a rank and a MCS to mobile device 16 for uplink transmissions.

For TDD systems, mobile station 16 may estimate the channel matrix (H) from downlink pilot signals from base station 14. Base station 14 may send received/estimated carrier to interference-plus-noise ratio (CINR) to mobile device 16. Mobile device 14 may then select and transmit an indicator of rank, MCS and power headroom to base station 14. The pilot signals may be dedicated, thus no PMI may be reported to base station 14. The precoder selection may be specific to the mobile station implementation (e.g. wideband PMI versus narrowband PMI). Base station 14 may reduce the rank and MCS level.

In both TDD and FDD systems, interference-plus noise over thermal noise (IoT) estimation may be filtered across time and/or frequency at base station 14.

As previously discussed, in contrast to open-loop MIMO, in closed-loop MIMO, the transmitter, e.g. mobile device 16, may use channel state information to adjust the transmission parameters. Exemplary techniques for closed-loop MIMO may include 2 transmit antennas (rank 1, rate 1); 4 transmit antennas (rank 1, rate 1); 2 transmit antennas (rank 2, rate 2); 4 transmit antennas (rank 2, rate 2); and semi-rank adaptation, for example, based on geometry, and dynamic rank adaptation. The codebook employed may be the WiMax codebook, or new code books, such as DFT.

Operation of closed-loop SU-MIMO may otherwise be similar to open-loop SU-MIMO, previously detailed above, with the exception that the parameters may include PMI. The channelization may be localized.

In an exemplary embodiment of the present disclosure, in certain situations, base station 14 may shift into uplink collaborative multi-user (MU) MIMO. As previously noted, MU-MIMO may be employed when it is desired to increase overall system throughput, but not necessarily maximize the throughput of any one mobile device. Specifically, it may be appreciated that in conventional collaborative MU-MIMO, several users may share the same radio resource simultaneously; that is, each mobile station 16 may transmit on the same channel with one antenna and base station 14 may receive all of these transmissions with two antennas. In this manner, one base station may serve many mobile devices simultaneously. For example, several mobile devices, including mobile device 16 may each transmit on the same channel with each of their antennas (e.g. antenna 40), and base station 14 may receive all of these transmissions with antennas 28, providing it has sufficient receive antennas.

In one embodiment of higher order collaborative MU-MIMO, each mobile device 16 may transmit with two antennas (e.g. antennas 40) for diversity and each base station may have two or more receive antennas (e.g. antennas 28). Each transmitter may transmit one data stream using appropriate multiplexing and encoding techniques, e.g. SM antenna hopping, STTD (space time block coding based transmit diversity) or SM CDD. In another embodiment of higher order collaborative MU-MIMO, mobile device 16 may transmit with two antennas for diversity and spatial multiplexing. Each base station may have at least four receive antennas. Each mobile device may transmit one data stream using appropriate techniques, e.g. SM antenna hopping, STTD or SM CDD, or two data streams using, e.g. SM. The channelization may be diversity or localized.

Similar to SU-MIMO, collaborative MU-MIMO may be open-loop or closed-loop. Open-loop collaborative MU-MIMO may be similar to open-loop SU-MIMO, except that in the FDD and TDD system, the base station 14 may further decide user pairing, rank and MCS per mobile device 16, and transmit an indication of these parameters to mobiles device 16. In the TDD system, in addition to sending received/estimated interference-plus-noise ratio to the mobile station 16, base station 14 may also transmit an indicator of multi-user interference to mobile device 16. The multi-user interference estimation may be controlled or carried by base station 14.

In closed-loop collaborative MU-MIMO, each mobile device, e.g. mobile device 16, may have two or more transmit antennas, e.g. antennas 40. Each base station, e.g. base station 14, may have two or more receive antennas, e.g. antennas 28. Each mobile device may precode to form one or more transmission streams. In on embodiment, mobile device 16 may transmit one or two streams with two antennas (rank 1) and base station 14 may receive with two antennas. In another embodiment, mobile device 16 may transmit with two antennas (rank 1 or rank 2) and base station 14 may receive with at least four antennas. In particular, each mobile device may apply its own precoder to form one or two streams. In both embodiments, base station 14 may schedule and decode multiple transmission streams from multiple mobile devices. Localized channelization may be used. Also, mobile device pairing for CMIMO may be supported by group messages for applications such as VoIP.

Moreover, closed-loop collaborative MU-MIMO may be similar to closed-loop SU-MIMO, except that in the FDD and TDD systems, base station 14 may further decide user pairing and MCS per mobile device and transmit these parameters to mobile devices 16. In the TDD system, base station 14 may also transmit an indicator of multi-user interference, as carried or controlled by base station 14.

Conveniently, the disclosed method includes adaptation between SU-MIMO and MU-MIMO modes based on, for example, geometry-based parameters, such as the physical configuration of the network, and channel-based parameters such as channel conditions. Base station 14 (or base station controller 10) may include a controller for controlling adaptation between the two. For example, if base station 14 (or base station controller 10) determines that the system should be shifted to MU-MIMO at a given time, it may send a MU-MIMO request to mobile device 16. Mobile device 16 may in turn, dynamically monitor for receipt of a MU-MIMO request from base station 14 (FIG. 7) and switch to MU-MIMO upon receipt of such a request.

Notably, in both SU-MIMO and MU-MIMO modes, mobile device 14 may dynamically switch between open-loop and closed-loop during the course of transmission of a particular data stream depending on, for example, channel conditions. For example, a previously stationary mobile device transmitting in closed-loop mode may switch to open-loop mode upon beginning to move quickly.

In addition to the foregoing, open-loop uplink MIMO may be employed for control transmissions. Tile-based diversity channelization may be used. Methods for transmitting the control information may include MIMO per tile cyclic delay diversity (CDD) for non-coherent detection; MIMO per tile CDD for differential phase shift key (PSK); differential space time coding (STC) for non-coherent detection; and MIMO per tone CDD for coherent detection.

Uplink pilot signals may be multiplexed using FDM or CDM for both open-loop and closed-loop MU-MIMO. For CDM, collaboration may be transparent from point of view of the mobile device 16, that is, codes identify each mobile device's pilots. However, for FDM, the pilot pattern may change from SU-MIMO to MU-MIMO in order to avoid a pilot collision.

Figure 8:
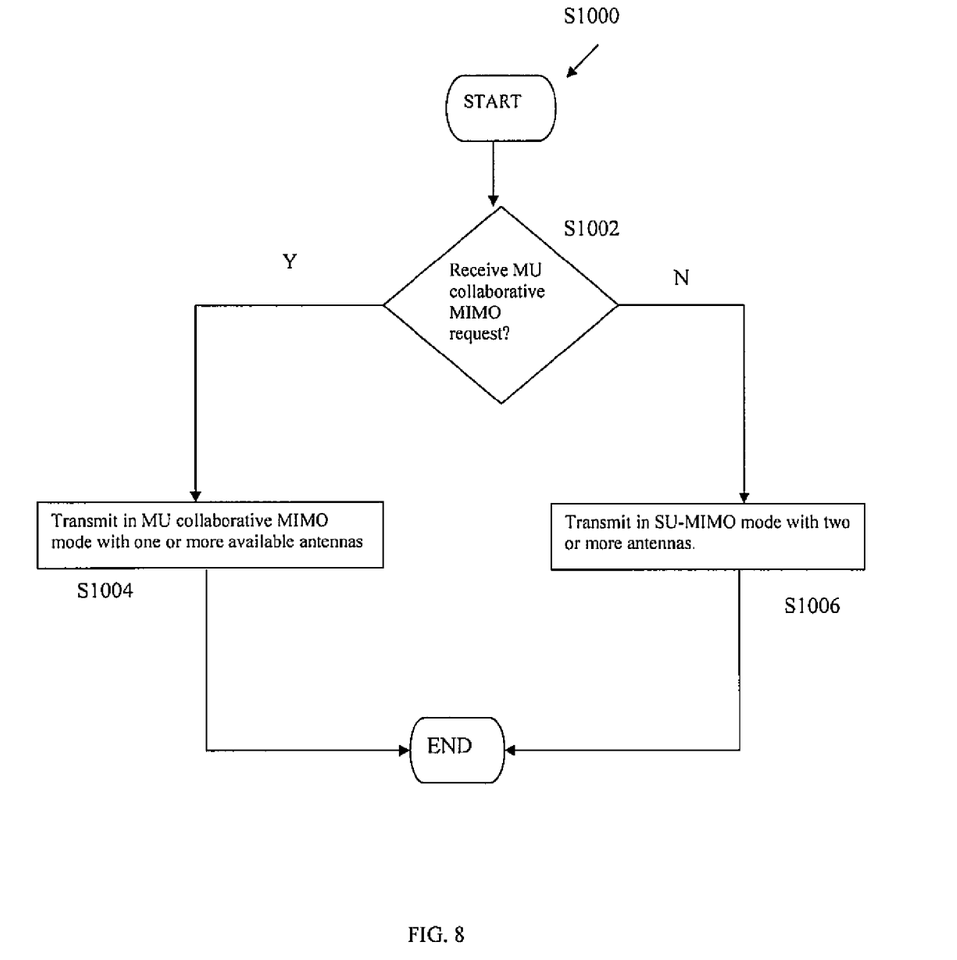
FIG. 8 is a flowchart of steps performed at a mobile communications device involving selecting between single-user and multiple-user MIMO modes, exemplary of another embodiment of the present disclosure.

In another embodiment of the present disclosure (flow diagram S1000, FIG. 8), upon receiving a collaborative MU-MIMO request (S1002), mobile device 16 may switch to transmitting in MU-MIMO mode with one or more of its antennas 40 (S1004). If no collaborative MU-MIMO request is received, mobile device 16 may transmit in SU-MIMO mode with two or more of its antennas 40 (S1006). This may allow mobile device 16 to take advantage of transmitting with two antennas in SU-MIMO mode until it receives a collaborative MU-MIMO request from, for example, base station 14, at which time mobile device 14 may drop down to transmitting with one antenna (or more than one antenna, for enhanced MU-MIMO mode).

With the availability of mobile devices with multiple antennas, uplink MIMO has now become a possibility. Selection of MIMO techniques such as described in the exemplary embodiments may conveniently improve user peak rate, transmission diversity and overall system capacity. Moreover uplink closed-loop MIMO may boost sector throughput in addition to celledge user coverage for data transmissions.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method comprising:
   selecting a transmission mode for an uplink transmission from a mobile device having multiple antennas to a base station having multiple antennas, the transmission mode being selected as:
      an open-loop single-user multiple-input, multiple output (MIMO mode when said mobile device is at high speed,
      as a closed-loop single-user MIMO mode when said mobile device is at low speed,
      or as a multi-user collaborative MIMO mode upon request, wherein selecting the multi-user collaborative MIMO mode includes an ability to select a higher-order collaborative MIMO; and
   controlling transmission of the uplink transmission in a selected transmission mode.

2. The method of claim 1 wherein said controlling transmission comprises dynamically selecting one of said open-loop single-user MIMO, said closed-loop single-user MIMO or said multi-user collaborative MIMO modes.

3. The method of claim 1 wherein said controlling transmission is responsive to receipt of a request from said base station to transmit in a selected one of said modes.

4. The method of claim 1 wherein control transmissions from said mobile device are transmitted in open-loop MIMO mode.

5. The method of claim 1 wherein said multi-user collaborative MIMO mode is a selected one of multi-user open-loop MIMO or multi-user closed-loop MIMO modes.

6. The method of claim 1 wherein uplink pilot signals are a selected one of FDM and COM multiplexed and said multi-user MIMO mode is selected to transmit said pilot signals.

7. The method of claim 1 further comprising adapting between a selected one of said single-user MIMO and said multi-user MIMO modes based on transmission channel characteristics.

8. The method of claim 1 wherein transmission in said open-loop single-user MIMO mode is performed by transmitting with two antennas of said mobile device at rate 1 with a selected one of space time block coding based transmit diversity (STTD), SM antenna hopping and SM cyclic delay diversity (CDD) to provide transmit diversity.

9. The method of claim 1 wherein transmission in said open-loop single-user MIMO mode is performed by transmitting with two antennas of said mobile device at rate 2 SM to provide spatial multiplexing.

10. The method of claim 1 further comprising prior to transmitting in said open-loop single-user MIMO mode, selecting parameters from at least one of rank and modulation and coding scheme (MCS).

11. The method of claim 1 further comprising prior to transmitting in said open-loop single-user MIMO mode:
   transmitting an indicator of power headroom to said base station; and
   receiving from said base station another indicator of at least one of rank or modulation and coding scheme (MCS), said another indicator based on previously transmitted data or control channel transmissions.

12. The method of claim 1 further comprising prior to transmitting in said open-loop single-user MIMO mode:
   transmitting a sounding signal and an indicator of power headroom to said base station; and
   receiving from said base station another indicator of at least one of rank and modulation and coding scheme (MCS).

13. The method of claim 1 wherein transmitting in said closed-loop single-user MIMO mode comprises transmitting with two antennas of said mobile device with a selected one of rank 1, rank 2 and rank adaptation.

14. The method of claim 1 further comprising prior to transmitting in said closed-loop single-user MIMO mode, pre-encoding transmissions with WiMAX codebook codes.

15. The method of claim 1 further comprising prior to transmitting in said closed-loop single-user MIMO mode:
   transmitting a sounding signal and an indicator of power headroom to said base station; and
   receiving from said base station another indicator of at least one of rank, PMI and modulation and coding scheme (MCS), said another indicator based on previously transmitted data or control channel transmissions.

16. The method of claim 1 further comprising prior to transmitting in said closed-loop single-user MIMO mode:
   estimating a channel matrix of a channel over which said transmitting occurs from a downlink pilot signal;
   receiving an indicator of an interference-plus-noise ratio of said channel;
   selecting at least one of rank, PMI and modulation and coding scheme (MCS), said selecting based on a measure of power headroom; and
   transmitting said at least one of said selected rank and MCS, and said power headroom to said base station.

17. The method of claim 1 further comprising receiving an indicator of a reduced rank and modulation and coding scheme (MCS) level from said base station.

18. The method of claim 5 wherein transmitting in said open-loop multiuser collaborative MIMO mode comprises transmitting a data stream over one antenna of said mobile device over a given channel wherein said given channel is shared with another mobile device.

19. The method of claim 5 wherein transmitting in said open-loop multi-user collaborative MIMO mode comprises transmitting one data stream over only two antennas of said multiple antennas to said base station, said base station having at least two receive antennas, said transmitting one data stream comprising transmitting using a selected one of SM antenna hopping, space time block coding based transmit diversity (STTD) or SM cyclic delay diversity (CDD).

20. The method of claim 5 wherein transmitting in said open-loop multi-user collaborative MIMO mode comprises transmitting two data streams over only two antennas of said multiple antennas to said base station, said base station having at least four receive antennas, said transmitting two data streams comprising transmitting using a selected one of SM antenna hopping, space time block coding based transmit diversity (STTD) or SM cyclic delay diversity (CDD).

21. The method of claim 5 further comprising prior to transmitting in said open-loop multi-user collaborative MIMO mode:
transmitting an indicator of power headroom to said base station; and
receiving from said base station another indicator of at least one of rank and modulation and coding scheme (MCS), said another indicator based on previously transmitted data or control channel transmissions.

22. The method of claim 5 further comprising prior to transmitting in said open-loop multi-user collaborative MIMO mode:
transmitting a sounding signal and an indicator of power headroom to said base station; and
receiving from said base station another indicator of at least one of user pairing, rank or modulation and coding scheme (MCS) for said mobile device.

23. The method of claim 5 wherein transmitting in said closed-loop multi-user collaborative MIMO mode comprises transmitting one data stream over only two antennas of said mobile device to said base station, said base station having at least two receive antennas, wherein said mobile device precodes data to form said one data stream.

24. The method of claim 5 wherein transmitting in said closed-loop multi-user collaborative MIMO mode comprises transmitting at least two data streams over only two antennas of said mobile device to said base station, said base station having at least four receive antennas, wherein said mobile device precodes data to form said at least two data streams.

25. The method of claim 5 further comprising prior to transmitting in said closed-loop multi-user collaborative MIMO mode:
transmitting a sounding signal and an indicator of power headroom to said base station; and
receiving from said base station another indicator of at least one of user pairing, PMI, rank and modulation and coding scheme (MCS) for said mobile device.

26. The method of claim 4 further comprising transmitting said control transmissions using a selected one of: (a) per tile cyclic delay diversity (CDD) for non-coherent detection, (b) per tone CDD for differential phase shift key (PSK), (c) differential space-time code (STC) for non-coherent detection, or (d) per tone CDD for coherent detection.

27. A method of uplink transmission from a mobile device having multiple antennas to a receiver having multiple antennas, comprising:
transmitting in single-user MIMO mode with multiple antennas, wherein transmitting in a single-user MIMO mode with multiple antennas includes an ability to transmit in single-user MIMO mode with two antennas; and
upon request, transmitting in multi-user collaborative MIMO mode with a subset of said multiple antennas, wherein transmitting in multi-user collaborative MIMO mode with a subset of said multiple antennas includes an ability to transmit in multi-user collaborative MIMO mode with one antenna.

28. The method of claim 27 wherein said request is received from a base station serving said mobile device.

29. The method of claim 27 further comprising adapting between said single-user MIMO and said multi-user MIMO modes based on transmission channel characteristics.

30. A mobile device, comprising:
a plurality of antennas; and
a processor operable to cause said mobile device to:
transmit in an open-loop single-user multiple-input, multiple output (MIMO) mode when said mobile device is moving with high velocity with multiple antennas of said plurality of antennas;
transmit in a closed-loop single-user MIMO mode when said mobile device is moving with low velocity with multiple antennas of said plurality of antennas;
transmit in a multi-user collaborative MIMO mode upon request with only a subset of said plurality of antennas;
control transmission from said mobile device in a selected one of said open-loop single-user MIMO, said closed-loop single-user MIMO or said multi-user collaborative MIMO modes; and
multiplex uplink pilot signals using FDM and transmit said multiplexed pilot signals in multi-user MIMO mode.

31. The device of claim 30 wherein said plurality of antennas comprises two antennas.

32. The device of claim 30 wherein said processor is further operable to cause said mobile device to: dynamically select between one of said open-loop single-user MIMO, said closed-loop single-user MIMO or said multi-user collaborative MIMO modes.

33. The device of claim 30 wherein said multi-user collaborative MIMO mode comprises higher order collaborative MIMO mode.

34. The device of claim 30 wherein said processor is further operable to cause said mobile device to: transmit control transmissions in open-loop MIMO mode.

35. A system comprising:
transmit circuitry, for a mobile device with a plurality of antennas, the transmit circuitry configured to:
transmit in an open-loop single-user multiple-input, multiple output (MIMO) mode when said mobile device is moving with high velocity with multiple antennas of said plurality of antennas;
transmit in a closed-loop single-user MIMO mode when said mobile device is moving with low velocity with multiple antennas of said plurality of antennas; and
transmit in a multi-user collaborative MIMO mode upon request with only a subset of said plurality of antennas, including an ability to transmit in a higher-order collaborative MIMO; and
control circuitry configured to control transmission from said mobile device in a selected one of said open-loop single-user MIMO, said closed-loop single-user MIMO or said multi-user collaborative MIMO modes.

36. The system of claim 35, embodied in a mobile device having a plurality of antennas.

* * * * *